T. H. ROWLAND.
MAUSOLEUM.
APPLICATION FILED JULY 3, 1911.
1,014,096.
Patented Jan. 9, 1912.
3 SHEETS—SHEET 2.
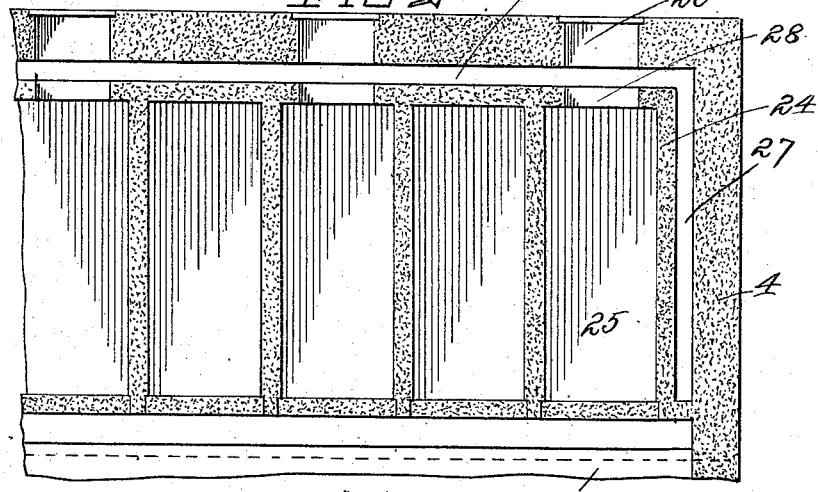
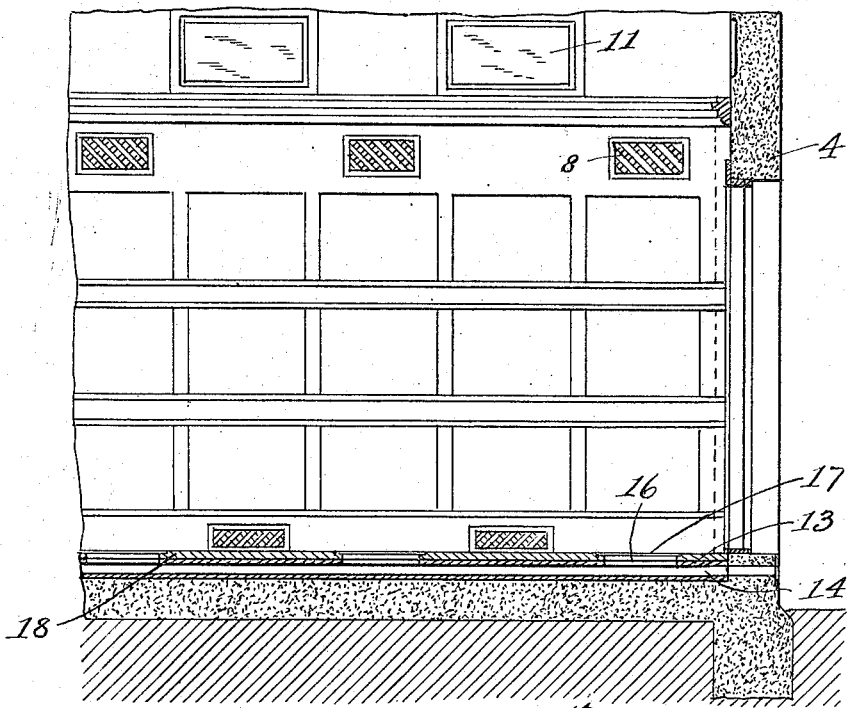
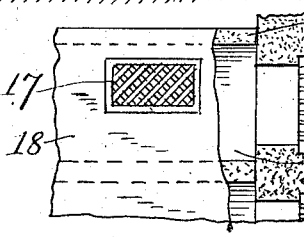
Witnesses
J. C. Turner
C. H. Tresch
Inventor
Thad H. Rowland
By B. W. Brockett
Attorney.

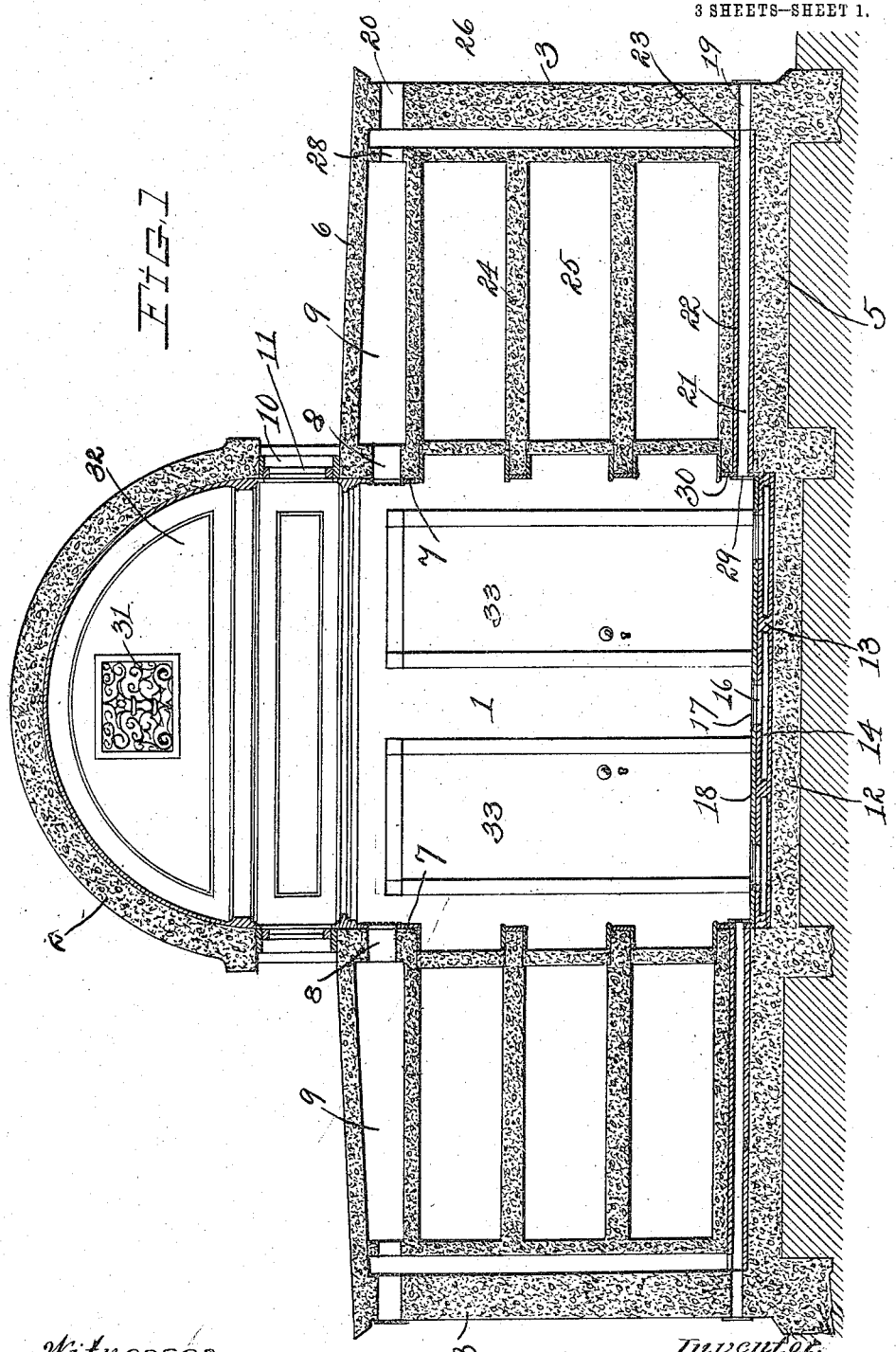

T. H. ROWLAND.
MAUSOLEUM.
APPLICATION FILED JULY 3, 1911.
1,014,096.
Patented Jan. 9, 1912.
3 SHEETS—SHEET 3.
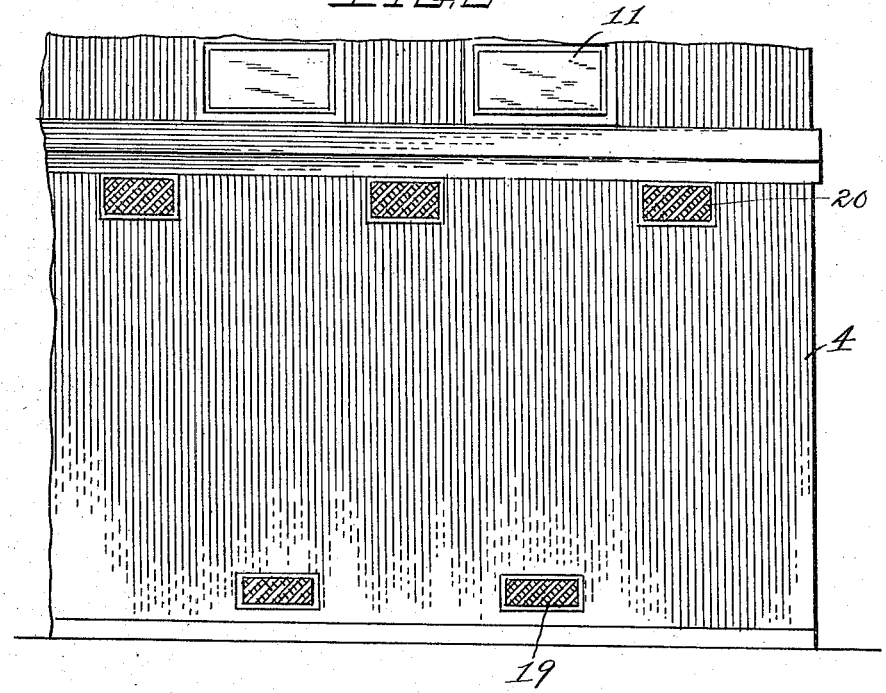
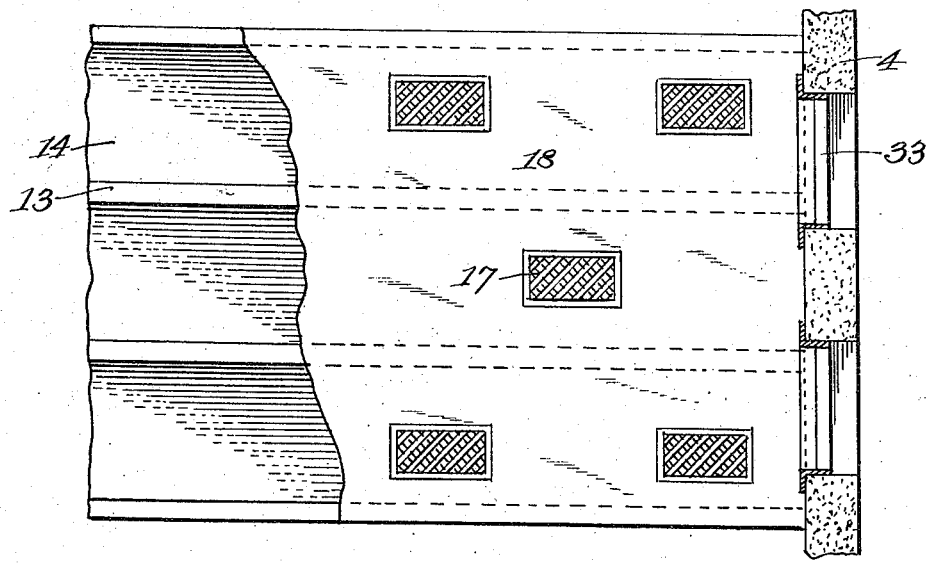
Witnesses.
J. C. Turner
C. H. Tresch
Inventor.
Thad H. Rowland
By B. W. Brockett
Attorney.

UNITED STATES PATENT OFFICE.

THAD H. ROWLAND, OF OBERLIN, OHIO.

MAUSOLEUM.

1,014,096. Specification of Letters Patent. Patented Jan. 9, 1912.

Application filed July 3, 1911. Serial No. 636,609.

*To all whom it may concern:*

Be it known that I, THAD H. ROWLAND, a citizen of the United States, residing at Oberlin, in the county of Lorain and State of Ohio, have invented certain new and useful Improvements in Mausoleums, of which the following is a specification.

In mausoleums it is essential that the bodies which are inclosed in the individual crypts should be cared for in such a way that condensation in and around the crypts and in and around the building, containing the crypts, should be absolutely prevented, if possible, and at any rate it should be reduced to a minimum. The most effective way to eliminate or prevent condensation is to cause the temperature within the crypt to vary with changes in the temperature within the mausoleum and with the temperature of the atmosphere outside and to cause changes in the atmosphere outside to be made with the temperature on the inside as quickly as possible, so that perfect ventilation within the mausoleum and about the crypts and especially on all portions of the crypts themselves is of the greatest importance.

This invention, therefore, relates to improvements in the construction and arrangement of a mausoleum which is provided with efficient means for quickly producing drafts throughout all portions of the mausoleum and about the crypts, thereby preventing condensation and causing the temperature within the mausoleum to correspond as near as possible with the temperature of the atmosphere outside.

Still more specifically the invention relates to a mausoleum comprising a shell or main building preferably provided with a corridor and one or more crypt chambers having in the outside wall thereof suitable ventilating openings near the bottom and ventilating openings near the top, the ventilating openings near the top being of greater capacity either in size or in number than those in the bottom, this feature being essential to produce a perfect draft. The corridor above the crypt chambers is also provided with suitable ventilating windows which are open for producing ventilation in the corridors. Upon the floor of the crypt chamber I preferably arrange a crypt support in the form of tiles having channels extending from the outside wall to the corridor and these openings communicate not only with the ventilating openings near the bottom of the outside wall of the crypt chamber but have other openings which communicate with a space which is provided behind the crypts which are supported upon the hollow tiles within the crypt chamber. These crypts are spaced from the end walls of the crypt chambers and from the back walls and from the roof so that there is an air space entirely around them for ventilation. The openings in the crypt support also communicate with the corridor and the air space above the crypts communicate with the corridor so that there is a complete circulation throughout. The floor of the corridor of the main shell or building is also provided with hollow tiles or similar supports having openings therein to provide longitudinal ventilating spaces or openings, and these openings communicate with the outside air through ports or openings in the ends of the building at the corridor. The floor is then laid upon these floor supports and if preferred, suitable ventilating openings and grids may be provided in the floor to establish communication with the longitudinal openings in the corridor.

The invention may be further briefly summarized as consisting in the construction and combination of parts hereinafter set forth in the following description, drawings and claims.

Referring to the drawings, Figure 1 is a vertical section of the building; Fig. 2 is a horizontal section taken through the upper ventilator openings; Fig. 3 is a front elevation of the crypts with the walls of the main building in section; Fig. 4 is a detail view of a portion of the end wall of the building at the corridor showing the ventilating opening leading to the longitudinal channels; Fig. 5 is a side elevation of the outside of the building; and Fig. 6 is a top plan view of a portion of the floor, part of the floor being broken away.

In carrying out the invention any preferred form and construction of building may be employed, but I have shown one form in the drawings which is highly effective, and in such embodiment, the building comprises a main central corridor 1 provided with an arched roof 2 and crypt chambers on either side of this corridor and comprising side walls 3 and end walls 4 and a suitable floor 5. A roof 6 extends from the upper portion of the corridor over the crypt chambers. The main side walls of the central corridor are extended down at 7 where they are provided with openings 8 between the corridor and a chamber 9 above the uppermost crypt. The side walls of the main corridor above the roof 6 are provided with ventilator openings 10 adapted to be closed by suitable windows 11. These ventilator windows are provided on each side of the central corridor portion. The main corridor is provided with a floor 12 which is below the level of the floors 5 of the crypt chambers, and on this floor 12 is a hollow tile construction 13 which provides longitudinal openings 14 extending the length of the corridor and adapted to communicate with openings 15 extending out through the main corridor portion of the building so that there is a circulation of air under the main floor. These openings 14 may communicate through suitable floor openings 16 with the corridor, and these openings are covered by suitable grids 17 in the floor 18.

The sides of the building are provided near the lower portions with air inlet vents 19, and upper outlet vents 20 of increased capacity either in point of size or number to the inlet vents 19, and the former communicate with openings 21 in a hollow tile construction 22 resting upon the floor 5 of each crypt chamber. This hollow tile construction is also provided with suitable vents or openings 23 near the side wall 3 for a purpose to be described.

Supported upon the hollow tile construction 22 is the crypt construction 24 provided with crypt chambers 25 and spaced from the side walls 3 and from the end walls of the main building to form air spaces 26 adjacent the side wall and air spaces 27 adjacent the end wall. This crypt construction extends to the downwardly extending portion 7. The spaces 26 and 27 are in communication at their outer corners with each other and communicate with the openings 21 in the hollow tile construction 22 by means of the opening 23 and by opening 28 with the chamber 9 above the uppermost crypt. Suitable openings 29 in the lower front plate or slab 30 which hides the ends of the hollow tile construction 22 serve to establish communication between the openings 21 and the main corridor. A ventilator 31 is arranged in each end 32 of the main corridor and suitable doors 33 serve as a means of access to the building.

The building may be constructed in any suitable manner but I prefer to make it seamless of cast concrete construction either reinforced or without reinforcement.

It is an important feature to have the floors upon which the crypt construction is supported elevated above the main floor of the corridor in order that the ventilating channels or openings under the crypts may open out into the corridor just above its floor.

It has been found in practice that it is very difficult to properly ventilate structures of this character and great care must be taken to bring about the changes in temperatures within the mausoleum with the temperature outside, and by the construction set forth herein this result is attained very effectively and in a very quick space of time.

Having described my invention, I claim:—

1. In a mausoleum, a shell of masonry or concrete comprising a corridor and a crypt chamber, floor supporting means in the corridor and provided with ventilating channels communicating with the outside air, a floor on said floor supporting means, crypt supporting means in the crypt chamber provided with ventilating channels communicating with the corridor above the floor and with the outside air, and a crypt of masonry or concrete mounted upon said crypt supporting means and spaced on all sides and the top from the shell to form ventilating spaces, said shell being provided with upper and lower ventilating openings.

2. In a mausoleum, a shell of masonry or concrete, a crypt chamber within said shell, a corridor within said shell, a crypt of masonry or concrete within said crypt chamber and exposed at one end to the corridor, a floor in said corridor, means for providing an independent source of outside air supply under the floor of the corridor and for the corridor, and means for providing a source of ventilation and outside air supply about the crypt and communicating with the corridor, said shell being provided with suitable openings for establishing a circulation.

3. In a mausoleum, a shell of masonry or concrete, a crypt chamber within said shell, a corridor within said shell, a crypt of masonry or concrete within said crypt chamber, means whereby ventilation is supplied to the crypt chamber about the crypt, said ventilating means communicating with the corridor, floor supporting means in said corridor and provided with ventilating channels independent of the other ventilating means of the building and connected with the outside air, and a floor upon said floor supporting means, said floor being provided with openings communicating with the corridor.

4. In a mausoleum, a shell of masonry or concrete, a crypt chamber therein, a corridor communicating with said crypt chamber, crypt supporting means provided with transverse channels in communication with the outside air and with the corridor, crypts of masonry or concrete mounted upon said crypt supporting means and spaced from the walls of the crypt chamber to provide ventilating spaces, said spaces being in communication with the ventilating openings in the crypt floor supporting means and communicating with ventilating openings in the upper portion of the crypt chamber and with the corridor, floor supporting means in the corridor and provided with ventilating openings communicating with the outside air, a floor mounted upon said means, and suitable ventilating means in the upper part of the corridor.

In testimony whereof I affix my signature in presence of two witnesses as follows.

THAD H. ROWLAND.

Witnesses:
 WM. EDWIN BROOKS,
 C. H. TRESCH.

Copies of this patent may be obtained for five cents each, by addressing the "Commissioner of Patents, Washington, D. C."